(12) United States Patent
Kim

(10) Patent No.: US 11,327,855 B2
(45) Date of Patent: May 10, 2022

(54) ELECTRONIC APPARATUS AND CONTROLLING METHOD THEREOF

(71) Applicant: SAMSUNG ELECTRONICS CO., LTD., Suwon-si (KR)

(72) Inventor: Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 16/705,611

(22) Filed: Dec. 6, 2019

(65) Prior Publication Data
US 2021/0011820 A1  Jan. 14, 2021

(30) Foreign Application Priority Data

Jul. 12, 2019  (KR) .................. 10-2019-0084293

(51) Int. Cl.
  *G06F 11/20* (2006.01)
  *G06F 3/14* (2006.01)
  *H04L 43/10* (2022.01)

(52) U.S. Cl.
  CPC ........ *G06F 11/2007* (2013.01); *G06F 3/1423* (2013.01); *H04L 43/10* (2013.01); *G06F 2201/85* (2013.01)

(58) Field of Classification Search
  CPC ... G06F 11/2007; G06F 3/1446; G06F 3/1423
  See application file for complete search history.

(56) References Cited

U.S. PATENT DOCUMENTS

| 5,689,678 A | 11/1997 | Stallmo et al. |
| 6,065,854 A | 5/2000 | West et al. |
| 6,353,888 B1 | 3/2002 | Kakehi et al. |
| 6,799,224 B1 | 9/2004 | Dellacona |

(Continued)

FOREIGN PATENT DOCUMENTS

| JP | 2007-298754 A | 11/2007 |
| JP | 2017-207580 A | 11/2017 |

(Continued)

OTHER PUBLICATIONS

Communication dated Apr. 7, 2021, from the European Patent Office in European Application No. 19215054.8.

(Continued)

*Primary Examiner* — Nadeem Iqbal
(74) *Attorney, Agent, or Firm* — Sughrue Mion, PLLC

(57) ABSTRACT

An electronic apparatus is provided. The electronic apparatus communicates with an external display apparatus including plural display modules, and includes first and second connection interfaces and a processor. The first communication interface is connected to a first display module from among the display modules connected together in a daisy chain configuration. The second communication interface is connected to a second display module from among the display modules. The processor transmits control data to the first display module through the first communication interface, and based on identifying that an error has occurred in a reception of the control data in any of the display modules, controls the second communication interface to transmit the control data to the second display module.

20 Claims, 10 Drawing Sheets

(56) References Cited

U.S. PATENT DOCUMENTS

| | | | |
|---|---|---|---|
| 10,031,711 B2* | 7/2018 | Bryczkowski | G06F 11/3003 |
| 10,235,120 B2 | 3/2019 | Cho et al. | |
| 2004/0233144 A1 | 11/2004 | Rader et al. | |
| 2009/0024867 A1* | 1/2009 | Gloege | G06F 11/2007 |
| | | | 714/3 |
| 2012/0319926 A1 | 12/2012 | Koebrich et al. | |
| 2012/0320006 A1 | 12/2012 | Koebrich et al. | |
| 2014/0149606 A1 | 5/2014 | Liu et al. | |
| 2015/0205565 A1* | 7/2015 | Koguchi | G09G 3/2088 |
| | | | 345/1.3 |
| 2018/0165051 A1 | 6/2018 | Kim et al. | |
| 2019/0179592 A1 | 6/2019 | Hyeon | |
| 2020/0183634 A1* | 6/2020 | Kruse | G06F 3/1446 |

FOREIGN PATENT DOCUMENTS

| | | | |
|---|---|---|---|
| JP | 2018-066831 A | 4/2018 | |
| KR | 10-1205452 B1 | 3/2013 | |
| KR | 1020130093853 A | 8/2013 | |
| KR | 10-2014-0066641 A | 6/2014 | |
| KR | 101548351 B1 | 8/2015 | |
| KR | 10-2016-0016523 A | 2/2016 | |
| KR | 1020190068123 A | 6/2019 | |

OTHER PUBLICATIONS

Communication dated Mar. 19, 2020 from the European Patent Office in application No. 19215054.8.

International Search Report (PCT/ISA/210) dated Apr. 10, 2020 from the International Searching Authority in application No. PCT/KR2019/017121.

Written Opinion (PCT/ISA/237) dated Apr. 10, 2020 from the International Searching Authority in application No. PCT/kr2019/017121.

* cited by examiner

ELECTRONIC APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2019-0084293, filed on Jul. 12, 2019, in the Korean Intellectual Property Office, the disclosure of which is incorporated by reference herein in its entirety.

BACKGROUND

1. Field

The disclosure relates to an electronic apparatus that transmits control data and video data to a display apparatus and a controlling method thereof.

2. Description of the Related Art

In the related art, in the case of a video wall device in which a plurality of display modules included in a display apparatus are connected in a daisy chain method as shown in FIG. 1, if there is an error in at least one display module or an error in a connection between the display modules, a portion of the display modules may not receive data transmitted from a source device.

In this case, since the image where video data or control data is applied is displayed on only the display modules which receive the data, an image is not displayed on some display modules or luminance values may be different for each display module.

SUMMARY

In accordance with an aspect of the disclosure, there is provided an electronic apparatus that communicates with an external display apparatus including a plurality of display modules, the electronic apparatus comprising a first communication interface connected to a first display module from among the plurality of display modules connected together in a daisy chain configuration; a second communication interface connected to a second display module from among the plurality of display modules; and a processor configured to transmit control data to the first display module through the first communication interface, and based on identifying that an error has occurred in a reception of the control data in at least one of the plurality of display modules, control the second communication interface to transmit the control data to the second display module.

In accordance with an aspect of the disclosure, the control data may comprise a communication checkup signal, and the processor may be configured to control the first communication interface to transmit the communication checkup signal including identification information of each of the plurality of display modules to the first display module at a timing interval, and based on a response signal to the communication checkup signal, identify that the error has occurred in a reception of the control data in at least one of the plurality of display modules.

In accordance with an aspect of the disclosure, the identification information of each of the plurality of display modules may include an internet protocol (IP) address, and the communication checkup signal may be a Packet internet Groper (Ping) signal.

In accordance with an aspect of the disclosure, the processor may be configured to identify at least one display module which does not receive the control data based on identification information of the at least one display module included in the response signal received in response to the communication checkup signal, and include the identification information of the at least one display module which does not receive the control data in control data and transmit the control data to the second display module.

In accordance with an aspect of the disclosure, the processor may be configured to, based on identifying that there is an error in a communication connection between the first communication interface and the first display module, control the second communication interface to transmit the control data to the second display module.

In accordance with an aspect of the disclosure, the first display module may be a master module, and the second display module may be a slave module.

In accordance with an aspect of the disclosure, the daisy chain configuration may be a communication connection configuration in which the control data transmitted to the first display module arrives at the second display module by sequential transmission through at least one third display module disposed between the first display module and the second display module.

In accordance with an aspect of the disclosure, each of the control data and the control data may include at least one of contrast information, brightness information, arrangement state information and/or power on/off information of each of the plurality of display modules.

In accordance with an aspect of the disclosure, the electronic apparatus may further comprise a third communication interface connected to the first display module; and a fourth communication interface connected to the second display module, wherein the processor is configured to transmit video data to the first display module through the third communication interface, and transmit the video data to the second display module through the fourth communication interface.

In accordance with an aspect of the disclosure, each of the plurality of display modules may include a Light Emitting Diode (LED) cabinet comprising a plurality of LED elements.

In accordance with an aspect to the disclosure, there is provided method of an electronic apparatus that communicates with an external display apparatus including a plurality of display modules, the method comprising transmitting control data to a first display module from among the plurality of display modules connected together in a daisy chain configuration; identifying whether an error has occurred in a reception of the control data by at least one of the plurality of display modules; and based on identifying that an error has occurred, transmitting the control data to a second display module from among the plurality of display modules.

In accordance with an aspect of the disclosure, the control data may comprise a communication checkup signal, and the identifying may comprise transmitting a communication checkup signal including identification information of each of the plurality of display modules to the first display module at a timing interval, and based on a response signal to the communication checkup signal, identifying that the error has occurred in a reception of the control data in at least one of the plurality of display modules.

In accordance with an aspect of the disclosure, the identification information of each of the plurality of display modules may include an internet protocol (IP) address, and wherein the communication checkup signal may be a Packet internet Groper (Ping) signal.

In accordance with an aspect of the disclosure, the transmitting the control data may comprise identifying at least one display module which does not receive the control data based on identification information of the at least one display module included in the response signal received in response to the communication checkup signal, and including the identification information of the at least one display module which does not receive the control data in the control data and transmitting the control data to the second display module.

In accordance with an aspect of the disclosure, the method may further comprise based on identifying that there is an error in a communication connection between the first communication interface and the first display module, transmitting the control data to the second display module.

In accordance with an aspect of the disclosure, the first display module may be a master module, and the second display module may be a slave module.

In accordance with an aspect of the disclosure, the daisy chain configuration may be a communication connection configuration in which the control data transmitted to the first display module arrives at the second display module by sequential transmission through at least one third display module disposed between the first display module and the second display module.

In accordance with an aspect of the disclosure, each of the control data and the control data may include at least one of contrast information, brightness information, arrangement state information and/or power on/off information of each of the plurality of display modules.

In accordance with an aspect of the disclosure, the method may further comprise transmitting video data to the first display module, and transmitting the video data to the second display module.

In accordance with an aspect of the disclosure, each of the plurality of display modules may include a Light Emitting Diode (LED) cabinet comprising a plurality of LED elements.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
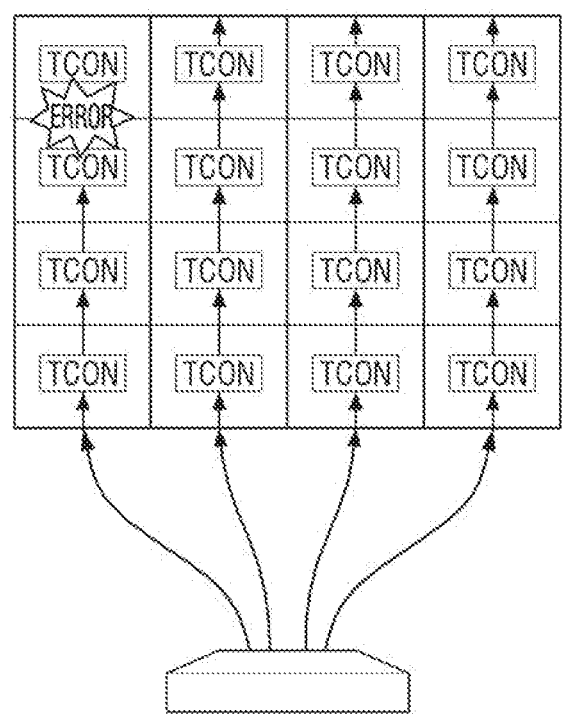
FIG. 1 is a view provided to explain a problem of the related art.

Hereinafter, the present disclosure will be described in detail with reference to the accompanying drawings.

Terms used herein will be briefly described, and the present disclosure will be described in detail.

The terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

Embodiments of the present disclosure may be variously modified and have various embodiments, and specific embodiments will be illustrated in the drawings and described in detail in the written description. However, this is not intended to limit the scope to the specific embodiments, it should be understood to include all transformations, equivalents, and substitutes included in the scope of the disclosed spirit and technology. In describing the embodiments, when it is determined that the detailed description of the related known technology may obscure the gist, the detailed description thereof will be omitted Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "at least one of A or/and B" may include all possible combinations of the items that are enumerated together. For example, the term "at least one of A or/and B" means (1) including at least one A, (2) including at least one B, or (3) including both at least one A and at least one B.

The term such as "first" and "second" used in various exemplary embodiments may use corresponding components regardless of an order and/or importance of the corresponding elements, and are used to distinguish one component from another without limiting the corresponding elements.

If it is described that a certain element (e.g., a first element) is "operatively or communicatively coupled with/to" or is "connected to" another element (e.g., a second element), it should be understood that the certain element may be connected to the other element directly or through still another element (e.g., a third element).

In the present disclosure, a 'module' or a 'unit' performs at least one function or operation and may be implemented by hardware or software or a combination of the hardware and the software. In addition, a plurality of 'modules' or a plurality of 'units' may be integrated into at least one processor (not illustrated) except for 'modules' or 'units' that should be realized in a specific hardware. In the present disclosure, the term "user" may refer to a person who uses an electronic apparatus or to an apparatus (e.g., an artificial intelligence (AI) electronic apparatus) that uses the electronic apparatus.

It is an aspect of the exemplary embodiments to minimize a control data reception error even if there is an error in some display modules from among a plurality display modules connected in a daisy chain configuration, or if there is a problem in the connection between display modules by transmitting control data through a plurality of communication interfaces.

According to the various embodiments described herein, even if there is an error in a display module or an error in a connection part between display modules, control data can be transmitted through a plurality of communication interfaces and thus, the number of display modules which do not receive the control data can be minimized.

According to the various embodiments described herein, the control data is transmitted through a plurality of communication interfaces only when an error is identified and thus, there is no problem of conflicting control data transmitted in both directions.

In addition, according to the various embodiments described herein, even if there is an error in the connection part between the electronic apparatus and the display modules, control data may be transmitted through the remaining communication interfaces.

Hereinafter, exemplary embodiments will be described in greater detail with reference to the accompanying drawings.

Figure 2:
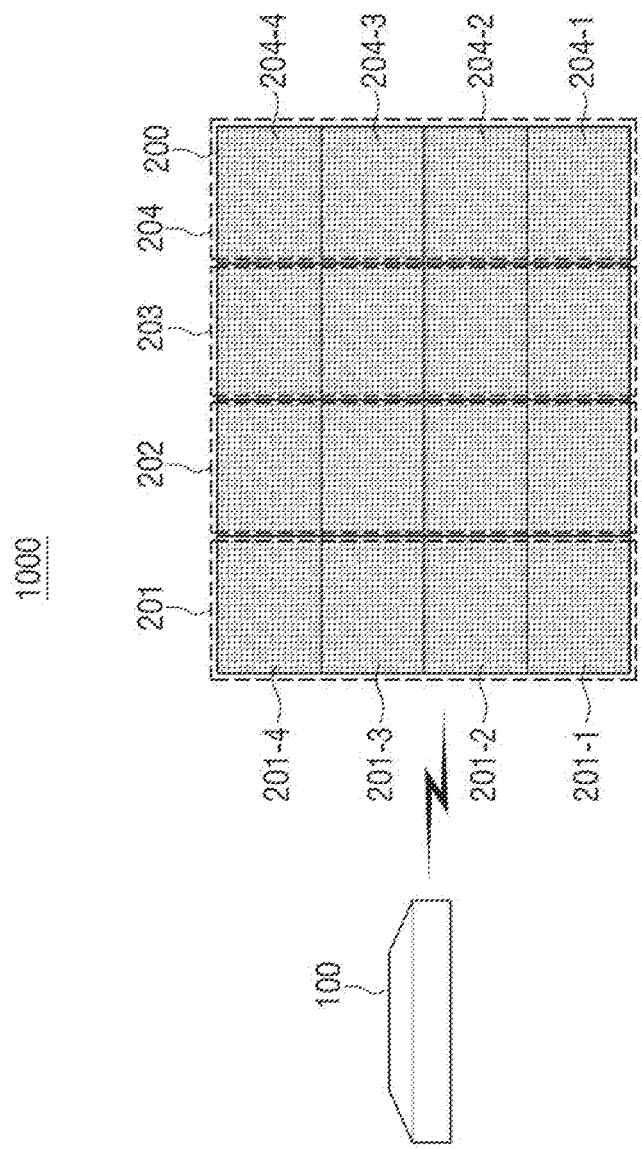
FIG. 2 is a view provided to schematically explain a configuration of an electronic system according to an embodiment.

FIG. 2 is a view provided to schematically explain a configuration of an electronic system according to an embodiment.

According to FIG. 2, an electronic system 1000 includes an electronic apparatus 100 and a display apparatus 200.

The electronic apparatus 100 may be an apparatus that provides video data to a display apparatus consisting of a plurality of display modules. In particular, the electronic apparatus 100 may be implemented as an image processing apparatus that provides the display apparatus 200 with video data obtained by processing the input video content and control data necessary for displaying the corresponding video data. Here, the video data may be data related to an image signal including Red (R), Green (G), Blue (B) pixel information, and the like. In addition, the control data may be data related to a control command signal for controlling the state of the display module. For instance, the control data may include at least one of contrast information, brightness information, arrangement state information, or power on/off information of the display module.

Specifically, the electronic apparatus 100 may transmit control data corresponding to each of a plurality of display modules to at least one of the plurality of display modules so that the control data reaches the corresponding display module, and may divide and transmit the input video data based on the arrangement state of a plurality of display modules in order to transmit a high quality image. For example, the electronic apparatus 100 may be implemented as an apparatus which processes the input data and transmits the processed data to the display apparatus 200, and may be, for example, a source box, a control box, a sanding box, a set-top box, and the like.

The display apparatus 200 displays video data provided from the electronic apparatus 100. The display apparatus 200 may be implemented as a TV, but is not limited thereto. The display apparatus 200 may be implemented as any apparatus with a display function such as video wall, large format display (LFD), digital signage, Digital Information Display (DID), projector display, and the like. In addition, the display apparatus 200 may be implemented as various types of displays such as liquid crystal display (LCD), organic light-emitting diode (OLED), Liquid Crystal on Silicon (LCoS), Digital Light Processing (DLP), quantum dot (QD) display panel, quantum dot light-emitting diodes (QLED), and the like.

The display apparatus 200 according to an embodiment may be configured to include a plurality of display modules. For example, as illustrated in FIG. 2, a plurality of display modules may be combined to form a single display apparatus. In some embodiments, the display apparatus 200 may include a plurality of self-luminous elements. Here, the self-luminous elements may be at least one of a Light Emitting Diode (LED) or a Micro LED.

In addition, each of the plurality of display modules may be implemented as an LED cabinet including a plurality of LED elements. Here, the LED elements may be implemented as an RGB LED, and the RGB LED may include a RED LED, a GREEN LED and a BLUE LED. In addition, in some embodiments, the LED elements may further include a White LED in addition to the RGB LED.

According to an embodiment, the LED elements may be implemented as a micro LED. Here, the micro LED is a LED with a size of about 5 to about 100 micrometers and is a tiny light emitting device that emits light without a color filter.

The display apparatus 200 according to an embodiment may be implemented by combining display modules connected in a daisy chain method.

Here, the daisy chain method denotes a method in which a plurality of display modules are connected in series, and the display module that receives data from the electronic apparatus 100 transmits the received data to another display module connected in series to order to transmit the data to all of the display modules connected in series sequentially.

For example, as illustrated in FIG. 2, a plurality of display modules in the form of 4×1 may be connected in a daisy chain method as a group. In other words, four display modules 201-1, 201-2, 201-3, 201-4 connected vertically in a daisy chain method are one group 201, and four groups 201, 202, 203, 204 may be combined to be implemented as one display apparatus 200, as shown in FIG. 2. That is, the group 204 may have four display modules 204-1, 204-2, 204-3, 204-4, and similar arrangements for the group 202 and the group 203.

For instance, the electronic apparatus 100 may transmit video data to one of the display modules that belong to each group (201 to 204), for example, to a master module of each group. For example, the electronic apparatus 100 may transmit the video data to the display module 201-1 as the display module for the one group 201, and the transmitted video data may be transmitted to the last display module 201-4 connected in the daisy chain method by going through the plurality of display modules 201-2, 201-3 according to the daisy chain method. However, if there is an error in at least one of the plurality of display modules (201-1 to 201-4) in the group 201 or there is an error in the connection between the display modules (201-1 to 201-4) in the group 201, the video data may not be transmitted to the last display module 201-4. Accordingly, the electronic apparatus 100 according to an embodiment may minimize a problem due to an error in receiving the video data by transmitting the video data to not only the first display module 201-1 but also the last display module 201-4 in the one group 201.

However, unlike the communication method of video data transmitting data through a broadcast method, in the case of control data transmitting data through a unicast or multicast method, the control data may collide when the control data is transmitted in both directions, i.e., to both the display module 201-1 and the display module 201-4. This collision is because in the case of the broadcast method, information such as "FF:FF:FF:FF:FF:FF" is input to the destination field without inputting an IP address of a specific display module.

Accordingly, the electronic apparatus 100 may first transmit control data to the first display module in each group, for example, the lowest display module 201-1 in the arrangement state and monitor whether there is a case where at least one display module does not receive the control data within the group 201 connected in the daisy chain method. If it is identified that there is a display module that does not receive the control data due to an error in at least one display module or an error in the connection part, the electronic apparatus 100 may transmit again the control data to the last display module, for example, the top display module 201-4 in the arrangement state. In this case, even when the control data is transmitted in both directions due to an error or an error in the connection part of the display module, a collision problem does not occur, and the number of display modules that do not receive the control data due to the bidirectional transmission may be minimized.

In FIG. 2, the plurality of display modules arranged vertically are described as one group, but the present disclosure is not limited thereto. In some embodiments, the display modules may be arranged horizontally or in the form of square as one group. In some other embodiments, all display modules included in the display apparatus 200 may be a group connected in a daisy chain manner.

Hereinafter, for convenience of explanation, the display module 201-1 which receives control data from the electronic apparatus 100 within an group connected in the daisy chain method will be described as a first display module, and the display module 201-4 which receives data from the electronic apparatus 100 when an error occurs in the reception of data will be described as a second display module.

Below, various embodiments where control data is transmitted in different directions based on the reception of control data of a display module will be described in detail.

Figure 3:
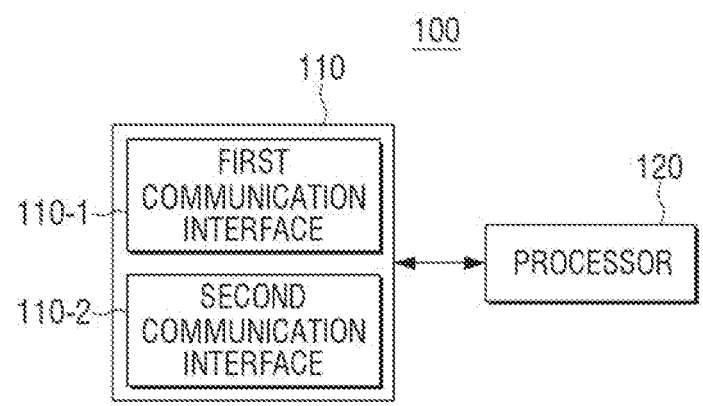
FIG. 3 is a block diagram provided to explain an operation of an electronic apparatus according to an embodiment.

FIG. 3 is a block diagram provided to explain an operation of an electronic apparatus according to an embodiment.

Referring to FIG. 3, the electronic apparatus 100 may include a communication interface 110 and a processor 120.

The communication interface 110 may include circuitry, and may communicate with the external display apparatus 200.

The communication interface 110 may communicate with the external display apparatus 200 based on a wired or wireless communication method.

The communication interface 110 may include a first communication interface 110-1 and a second communication interface 110-2 to transmit control data to the external display apparatus 200.

According to an embodiment, the communication interface 110 may use wired communication, and the first communication interface 110-1 may be physically connected to the first display module via a cable from among a plurality of display modules and the second communication interface 110-2 may be physically connected to the second display module via a cable.

Here, each of the first communication interface 110-1 and the second communication interface 110-2 may be implemented with different ports provided in the electronic apparatus 100. Under the control of the processor 120, each of the first communication interface 110-1 and the second communication interface 110-2 may transmit control data to the first display module and the second display module through an Ethernet communication method. Here, the cable may be V-by-One, but is not limited thereto. The cable may be High Definition Multimedia Interface (HDMI) cable, Low Voltage Differential Signals (LVDS) cable, Digital Visual Interface (DVI) cable, D-subminiature (D-SUB) cable, Video Graphics Array (VGA) cable, optical cable, and the like.

According to another embodiment, the communication interface 110 may transmit control data to the external display apparatus 200 via wireless communication, and the communication interface 110 may include at least one wireless communication module, such as a WiFi module (not illustrated), a Bluetooth module (not illustrated), an infrared (IR) module, a Local Area Network (LAN) module, and/or an Ethernet module, and the like. Here, each wireless communication module may be implemented in the form of at least one hardware chip. The wireless communication module may include at least one communication chip which performs communication according to various communication standards such as zigbee, Universal Serial Bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), etc. in addition to the above-described communication methods. However, this is only an example, and the communication interface 110 may use at least one communication module from among various communication modules.

In some embodiments, the communication interface 110 may further include a third communication interface and a fourth communication interface to transmit video data to the external display apparatus 200.

According to an embodiment, video data may be transmitted to the first display module through the third communication interface, and the video data may be transmitted to the second display module through the fourth communication interface. Here, the third communication interface and the fourth communication interface may physically share the same ports as the first communication interface 110-1 and the second communication interface 110-2, respectively. Accordingly, the control data and the video data may be transmitted to the external display apparatus through one cable. For example, the first communication interface 110-1 and the third communication interface may transmit control data and video data, respectively, through different lines in one cable.

However, this is only an example, and the third communication interface and the fourth communication interface may be implemented with different ports from each of the first communication interface 110-1 and the second communication interface 110-2. For example, the first communication interface 110-1 and the third communication interface may transmit control data and video data to the external display apparatus 200 through different cables, respectively.

Although not illustrated in the drawings, a communication interface (not illustrated) which receives video and control data from an input device (or a source device) (not illustrated) may be further included. For example, the communication interface (not illustrated) may receive video and control data based on a wireless communication method such as an Ethernet, etc. However, some control data, for example, control data related to the arrangement state, on/off state, etc. of the display apparatus 200 may be generated in the electronic apparatus 100. The input device may be implemented as a video wall processor, a multi-video output PC, a matrix switcher, a server, etc.

The processor 120 may be electrically connected to a memory (not illustrated in FIG. 3), and may control the overall operations of the electronic apparatus 100.

According to an embodiment, the processor 120 may be implemented as a digital signal processor (DSP) for processing digital signals, a microprocessor, or a Time controller (TCON). However, this is only an example, and the processor 120 is not limited thereto. The processor 120 may include at least one or more of central processing unit (CPU), micro controller unit (MCU), micro processing unit (MPU), controller, application processor (AP) or communication processor (CP), ARM processor, and Artificial Intelligence (AI) processor, or may be defined as the corresponding term. In addition, the processor 120 may be implemented as System on Chip (SoC) or large scale integration (LSI) equipped with a processing algorithm, or may be implemented in the form of Field Programmable gate array (FPGA). Further, the processor 120 may perform various functions by executing computer executable instructions stored in the memory.

The processor 120 according to an embodiment may transmit control data through the first communication interface 110-1 to the first display module from among a plurality of display modules connected in the daisy chain method.

Here, the control data denotes data regarding a control command signal for controlling the state of each of the plurality of display modules, and may include at least one of contrast information of each of the plurality of display modules, brightness information, arrangement state information or power on/off information, color correction information, firmware data, refresh rate information, and a blackout signal. In addition, the control data may include data for querying the state of each of the plurality of display modules. For example, the control data may include at least one of temperature information of each display module, operation time information, LED line error information, and firmware version information. Here, the control data may be received from outside of the electronic apparatus 100 together with the video data, or may be generated by the processor 120.

The plurality of display modules denote one display module group connected in the daisy chain method, and a plurality of such display module groups may be connected to implement one display apparatus 200.

Figure 5:
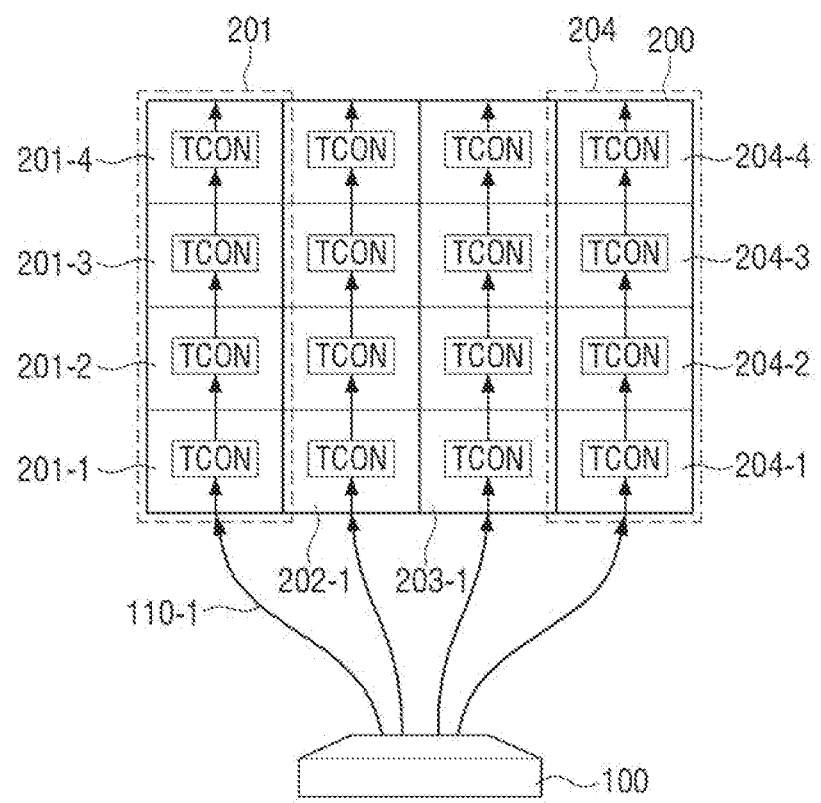
FIG. 5 is a view provided to explain a daisy chain method of a modular display apparatus according to an embodiment.

For example, as illustrated in FIG. 5, according to the daisy chain method, one group may consist of four display modules arranged vertically, in which data is transmitted from the first display module 201-1 that is the lowest display module to the second display module 201-4 that is the top display module. Other groups 202-204 operate similarly to group 201. According to FIG. 5, four groups (201 to 204) may be combined to implement the external display apparatus 200. In FIG. 5, the display modules arranged vertically are assumed to be a group, but this is only an example. The display modules arranged horizontally or in the form of square may correspond to one group.

Figure 6:
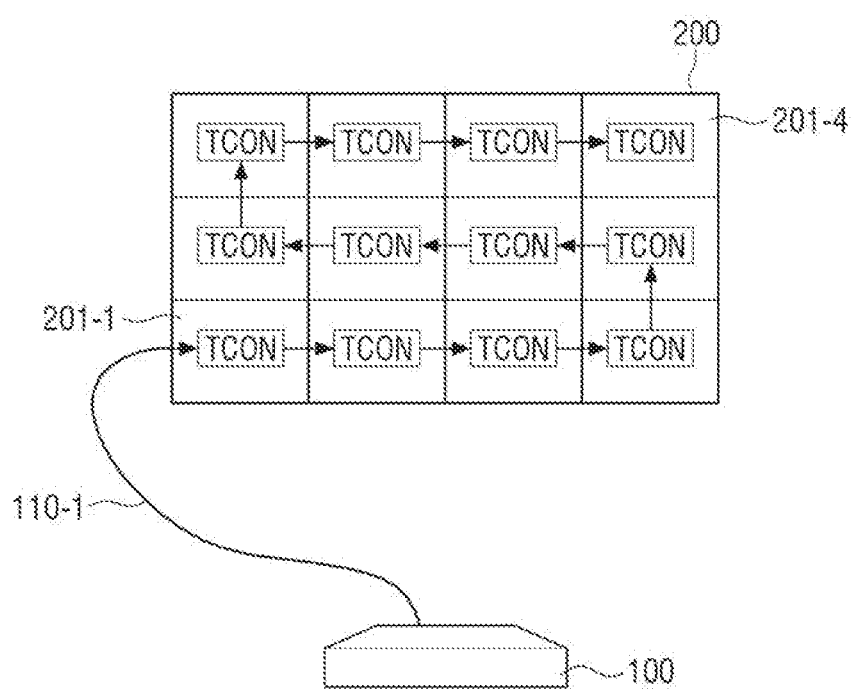
FIG. 6 is a view provided to explain a daisy chain method of a modular display apparatus according to an embodiment.

In some embodiments, as illustrated in FIG. 6, all display modules included in the display apparatus 200 may be connected according to the daisy chain method.

Here, the daisy chain method denotes a serial connection method in which control data transmitted to the first display module sequentially reaches the second display module via at least one third display module disposed between the first display module and the second display module. That is, as shown in FIG. 6, control data transmitted to display module 201-1 sequentially reaches the display module 201-4 via ten third display modules disposed between the display module 201-1 and the display module 201-4, where the sequential transmission is shown by the arrows in FIG. 6.

In addition, the first display module may be a main display module which receives control data transmitted from the electronic apparatus 100 in a normal state in which there is no error in the reception of the control data in a plurality of display modules, and may be a starting point of the plurality of display modules which are connected in the daisy chain method. For example, in the configuration of FIG. 5, the display modules 201-1, 202-1, 203-1, and 204-1 disposed at the bottom of FIG. 5 may be the first display modules, and the first communication interface 110-1 may be connected to the first display modules. In the configuration of FIG. 6, the display module 201-1 disposed at the lower left of FIG. 6 may be the first display module, and the first communication interface 110-1 may be connected to the first display module.

The processor 120 may identify whether an error has occurred in the reception of control data in at least one of the plurality of display modules.

Here, the occurrence of an error in the reception of control data may include at least one of a case where there is an error (e.g., a timing controller error) in at least one display module itself or a case where there is an error in the connection part between the display modules, causing at least one display module not to receive the control data.

According to an embodiment, in order to identify whether an error has occurred in the reception of control data in at least one of the plurality of display modules, the processor 120 may control the first communication interface 110-1 to transmit a communication checkup signal as the control data to the first display module at timing intervals. The communication checkup signal may include identification information of each of the plurality of display modules. The timing intervals may be predetermined. Here the identification information may include IP address information, and may include an intrinsic identification number such as a serial number, an identification name, and the like. The communication checkup signal may be a Packet Internet Groper (Ping) signal. The Ping signal denotes a signal used to identify whether an error has occurred in a device, a system or a connection part connected thereto, and the device or system that receives the Ping signal may transmit a response signal corresponding to the Ping signal within a predetermined time if no error has occurred. For example, the processor 120 may transmit a communication checkup signal to a display module through a broadcast method, but this is only an example. The processor 120 may transmit a communication checkup signal through a multicast method or a unicast method.

According to an embodiment, the processor 120 may transmit a communication checkup signal to the first display module at timing intervals, and may identify at least one display module which does not receive control data based on the identification information of the at least one display module which does not receive control data included in a response signal received from the first display module.

Figure 7:
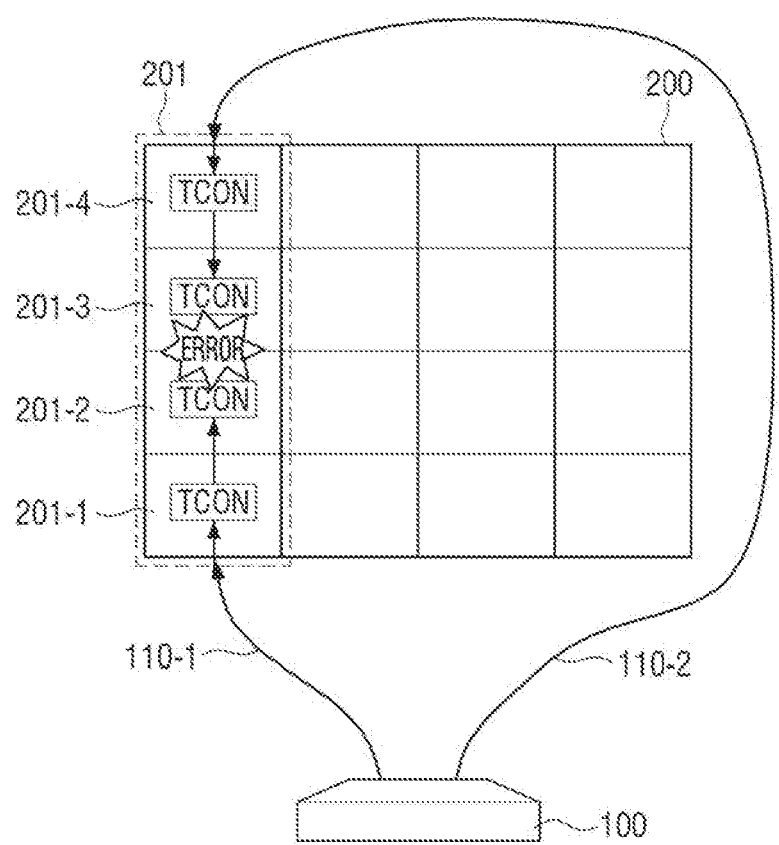
FIG. 7 is a view provided to explain a case in which a communication interface is changed when an error occurs in control data transmission according to an embodiment.

Referring to FIG. 7, it is assumed that there is a problem in the connection between the second display module 201-2 and the third display module 201-3, which are disposed between the first display module 201-1 and the second display module 201-4. For example, the problem may be in a cable connecting the second and third display modules 201-2 and 201-3.

For example, the processor 120 may transmit a Ping signal to the first display module 201-1 through the first interface 110-1 at one minute intervals. In this case, the Ping signal transmitted to the first display module 201-1 is transmitted to the second display module 201-2 through the first display module 201-1. The second display module 201-2 may transmit a response signal to the first display module 201-1, and the first display module 201-1 may transmit a response signal to the received Ping signal to the electronic apparatus 100 within a predetermined time. Here, the response signal may include the identification information of the subject transmitting the response signal. For example, the first display module 201-1 may include its own identification information and identification information of the display module 201-2 in the response signal and transmit the same to the electronic apparatus 100. However, due to the error in the connection between the display module 201-2 and the display module 201-3, the Ping signal is not transmitted to the display module 201-3 and the second display module 201-4 and thus, the electronic apparatus 100 cannot receive a response signal from the display module 201-3 and the second display module 201-4. Accordingly, the processor 120 may identify that the display modules which have not received the control data are the display module 201-3 and the second display module 201-4 based on the identification information included in the received response signal. If there is no identification information from a display module indicating that the response has been received in the response to the Ping signal, it is identified that the control data is also not transmitted normally.

As such, if it is identified that there is an error in the reception of the control data in at least one of a plurality of display modules, the processor 120 may control the second communication interface 110-2 to transmit the control data to the second display module.

Specifically, the processor 120 may include the identification information of at least one display module which has not received the control data in the control data and transmit the same to the second display module. Here, the second display module is a sub display module which receives control data transmitted from the electronic apparatus 100 after it is identified that there is an error in the reception of the control data in at least one of the plurality of display modules, and may be the end point of the plurality of display modules connected in the daisy chain method. In the configuration of FIG. 5, the display modules 201-4, 202-4, 203-4, and 204-4 disposed at the top of the groups 201-204 may be the second display modules/sub display modules, and the second communication interface 110-2 may be connected to the second display modules. In the configuration of FIG. 6, the display module 201-4 disposed at the upper right may be the second display module/sub display module, and the second communication interface 110-2 may be connected to the second display module. As such, the second display module may be used to provide a redundancy situation in the event that the control data transmitted through the first communication interface 110-1 is not transmitted to all display modules connected in the daisy chain method and thus, may be referred to as a redundancy module.

For instance, the processor 120 may include the identification information of the display module 201-3 and the second display module 201-4 in the destination field of the Ethernet packet included in the control data and, as illustrated in FIG. 7, may transmit the control data to the second display module 201-4 through the second communication interface 110-2. In this case, the control data may be transmitted to the third display module 201-3 and the second display module 201-4.

Meanwhile, if there is a display module from which a response signal has not been received after a communication checkup signal was transmitted through the first communication interface 110-1, the processor 120 may transmit a communication checkup signal through the second communication interface 110-2 and identify whether an error has occurred in the display module or in the connection based on the response signal. For example, it is assumed that an error has occurred in the connection between the second display module 201-2 and the third display module 201-3 as illustrated in FIG. 7. In this case, in response to the Ping signal transmitted through the first interface 110-1, identification information of the first display module 201-1 and the second display module 201-2 may be included in a response signal to the electronic apparatus 100 within a predetermined time. Subsequently, the processor 120 may transmit a communication checkup signal through the second communication interface 110-2. In this case, identification information of the second display module 201-4 and the display module 201-3 may be included in a response signal to the electronic apparatus 100 within a predetermined time. The processor 120 may identify that an error has occurred in the connection between the display module 201-2 and the display module 201-3 based on the identification information included in the response signals regarding the communication checkup signals. The processor 120 may store error occurrence information in the memory, and transmit the error occurrence information to an external server. Here, the error occurrence information may include the time period when the error occurred, the identification information of the connection or display module where the error has occurred, etc. In some embodiments, the external server may be a server that manages the display apparatus. In some embodiments, the external server may manage error information from a plurality of display apparatuses.

According to another embodiment, each of a plurality of display modules may transmit a heartbeat signal to the electronic apparatus 100 periodically even without receiving a communication checkup signal from the electronic apparatus 100. Here, the heartbeat signal denotes a signal for indicating that a display module is operating normally, and the signal is generated by each display module regardless of the communication checkup signal transmitted from the electronic apparatus 100 and then transmitted to the electronic apparatus 100.

Specifically, each of a plurality of display modules may include its own identification information in a heartbeat signal and transmit the same to the electronic apparatus 100.

In this case, the processor 120 may identify at least one display module from which a heartbeat signal has not been received based on the identified information included in the received heartbeat signal.

Referring to FIG. 7, it is assumed that there is a problem in the connection between the display module 201-2 and the display module 201-3 which are disposed between the first display module 201-1 and the second display module 201-4. The problem may be in a cable connecting the display modules 201-2 and 201-3.

The display module 201-2 may transmit a heartbeat signal to the electronic apparatus 100 through the first display module 201-1, and the first display module 201-1 may also transmit a heartbeat signal to the electronic apparatus 100. However, the heartbeat signal of the display module 201-3 and the second display module 201-4 may not transmit a heartbeat signal to the electronic apparatus 100 through the first display module 201-1 due to the error in the connection. Accordingly, the processor 120 may identify that the display module 201-3 and the second display module 201-4 have not received control data based on the received heartbeat signal.

In this case, the processor 120 may control the second communication interface 110-2 to transmit control data to the second display module 201-4.

In other words, the processor 120 may identify the display module which has not received control data based on at least one of a response signal corresponding to a communication checkup signal or a heartbeat signal transmitted from a plurality of display modules.

If it is identified that an error has occurred in the communication connection between the first communication interface 110-1 and the first display module, the processor 120 control the second communication interface 110-2 to transmit control data to the second display module.

Specifically, the processor 120 may monitor the communication connection state between the first communication interface 110-1 and the first display module and the communication connection state between the second communication interface 110-2 and the second display module at timing intervals.

For example, the processor 120 may identify each communication connection state using a cable detection technology. For instance, it is assumed that the first communication interface 110-1 is implemented as the first port, and the second communication interface 110-2 is implemented as the second port. The processor 120 may detect a voltage from the first port and the second port periodically and identify a communication connection state based on the detected voltage value.

For example, if the voltage value detected from the first port is less that a threshold value, and the voltage value detected from the second port is equal to or greater than the threshold value, the processor 120 may identify that an error has occurred in the communication connection between the first communication interface 110-1 and the first display module 201-1. Accordingly, the processor 120 may transmit control data to the second display module 201-4 through the second communication interface 110-2 of which communication connection state is normal. However, the technology of identifying a communication connection state using a detected voltage value is only an example, and the communication connection state between the communication interface 110 and a display module may be identified through various methods.

Since the first communication interface 110-1 and the second communication interface 110-2 are provided for a redundancy situation, the processor 120 may transmit control data through the remaining interfaces even if there is a problem in the connection state of one communication interface.

In another example, if it is determined that an error has occurred in the communication state between the second communication interface 110-2 and the second display module 201-4, the processor 120 may transmit control data to the first display module 201-1 through the first communication interface 110-1.

The first display module may be a master (main) module, and the second display module and the remaining display modules excluding the first display module from among a plurality of display modules connected in the daisy chain method may be slave (sub) modules. Accordingly, if the communication connection state between the first communication interface 110-1 and the first display module 201-1 is normal, and the communication connection state between the second communication interface 110-2 and the second display module 201-4 is normal, the processor 120 may transmit control data to the first display module through the first communication interface 110-1 by giving a high priority to the first display module which is the master module. For example, in the case of the daisy chain method where the display modules are disposed vertically as illustrated in FIG. 5, the display module which is disposed at the bottom may be the first display module which is a master module. In other words, the display modules 201-1, 202-1, 203-1, and 204-1 which are disposed adjacent to the electronic apparatus 100 may be the first display modules, but is not limited thereto. Either one of the display modules disposed at ends of a group of the plurality of displays connected in the daisy chain method may be a master module. In other words, in the configuration of FIG. 5, either the display module 201-1 or the display module 201-4 may be a master module for the group 201, and either the display module 204-1 or the display module 204-4 may be a master module for the group 204, and so on.

The processor 120 may allocate a first IP address to a master module. Subsequently, the master module may allocate an IP address different from the first IP address to each of the remaining display modules connected in the daisy chain method through a Dynamic Host Configuration Protocol (DHCP) function. Here, the DHCP function denotes a function that the master device dynamically allocates different IP addresses to the slave devices so as to prevent a collision between the devices connected in the daisy chain method. The master module may allocate a different IP address to each slave device, and transmit the allocated IP address information to the electronic apparatus 100. Accordingly, the electronic apparatus 100 may obtain the IP address information of each display module.

Referring to FIG. 5, as an example, when the processor 120 allocates the IP address of the first display module 201-1, the first display module 201-1 subsequently allocates the IP addresses to the remaining display modules 201-2, 201-3, 201-4 of the group 201 such that the IP addresses do not overlap with each other, and transmits the allocated IP address information to the electronic apparatus 100.

Accordingly, the electronic apparatus 100 may obtain the IP address information of the plurality of display modules connected in the daisy chain method, and set the destination information (destination field) of the control data to be transmitted based on the obtained IP address information.

For example, when transmitting control data for increasing the brightness value of the first display module as much as 'a' and decreasing the brightness value of the second display module as much as 'b', the processor 120 may include the identification information of the first display module in the destination field of the control data packet including a command to increase the brightness value by 'a', and include the identification information of the second display module in the destination field of the control data packet including a command to decrease the brightness value by 'b.' Accordingly, each display module may identify whether to execute an operation corresponding to the command included in the control data in its own module.

As such, as the master module allocates an IP address to a slave module, the amount of computation of the processor 120 may be reduced. However, in some cases, the processor 120 may allocate an IP address to all display modules.

The processor 120 may transmit video data to the first display module through the third communication interface connected to the first display module, and transmit the video data to the second display module through the fourth communication interface connected to the second display module.

Here, the third communication interface and the fourth communication interface may physically share the same port with each of the first communication interface 110-1 and the second communication interface 110-2. Accordingly, control data and video data may be transmitted to an external display apparatus through one cable, but for example, the first communication interface 110-1 and the third communication interface may transmit the control data and the video data separately through different lines in the cable.

However, this is only an example, and the third communication interface and the fourth communication interface may be implemented with different ports from the first communication interface 110-1 and the second communication interface 110-2, and transmit the control data and the video data to the external display apparatus 200 through different cables.

If video data is transmitted to the external display apparatus through a broadcast method, there is no collision issue even if the video data is transmitted in both directions and thus, the processor 120 may transmit the video data to the external display apparatus 200 through the first communication interface 110-1 and the second communication interface 110-2 regardless of whether there is an error in at least one of the plurality of display modules connected in the daisy chain method or in the connection part between the display modules.

Figure 4:
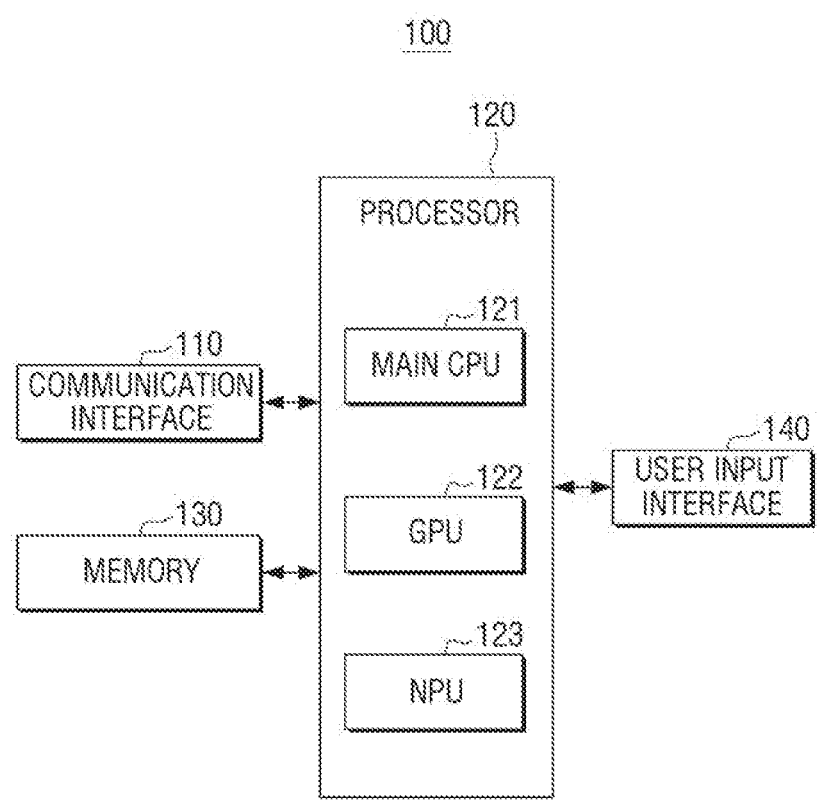
FIG. 4 is a block diagram provided to explain a detailed configuration of an electronic apparatus, according to an embodiment.

FIG. 4 is a block diagram provided to explain detailed configuration of an electronic apparatus, according to an embodiment.

Referring to FIG. 4, the electronic apparatus 100 includes the communication interface 110, the processor 120, a memory 130, and a user input interface 140. The memory 103 may be the same as the memory referenced with respect to FIG. 2 above. The detailed description of the elements overlapping with those in FIG. 2 will be omitted.

The communication interface 110 may further include the third communication interface and the fourth communication interface in addition to the first communication interface 110-1 and the second communication interface 110-2. Here, video data may be transmitted to the first display module through the third communication interface, and video data may be transmitted to the second display module through the fourth communication interface. Examples of the third communication interface and the fourth communication interface are similar with those of the above-described first communication interface 110-1 and the second communication interface 110-2. Thus, detailed description thereof will be omitted.

The processor 120 controls the overall operations of the electronic apparatus 100 using various programs stored in the memory 130. The processor 120 may include a Graphic Processing Unit (GPU) 122 for graphic processing corresponding to an image. The processor 120 may be implemented as a System On Chip (SoC) including a core (not illustrated) and the GPU 122. The processor 120 may include a single core, dual cores, triple cores, quad cores, and multiple cores thereof.

The processor 120 may include a main CPU 121, the GPU 122 and a neural processing unit (NPU) 123.

The main CPU 121 accesses the memory 130 and performs booting using O/S stored in the memory 130. The main CPU 121 performs various operations using various programs, content data, etc. stored in the memory 130. In particular, according to an embodiment, the main CPU 121 may copy programs stored in the memory 130 in a RAM according to a command stored in a ROM, and access the RAM to execute the corresponding programs.

The GPU 122 may correspond to a high performance processing device for graphic processing, and may be a specialized electronic circuit designed to accelerate image generation in a frame buffer to quickly process and change memory and output it to a screen. In addition, the GPU 122 may refer to a Visual Processing Unit (VPU).

The NPU 123 may correspond to an AI chipset (or AI processor) and may be an AI accelerator. The NPU 123 may correspond to a processor chip optimized for the execution of a deep neural network. The NPU 123 may correspond to a processing device that executes a deep learning model, and the NPU 123 may correspond to a processing device that executes a deep learning model along with the GPU 122.

The memory 130 is electrically connected to the processor 120, and may store data required for various embodiments.

Depending on the data storage usage, the memory 130 may be implemented in the form of an embedded memory in the electronic apparatus 100 or a separable memory from the electronic apparatus 100. For example, in the case of data for driving the electronic apparatus 100, the data is stored in an embedded memory of the electronic apparatus 100, and in the case of data for an extension function of the electronic apparatus 100, the data may be stored in a memory detachable from the electronic apparatus 100.

The memory embedded in the electronic apparatus 100 may be implemented as at least one of a volatile memory (e.g.: a dynamic RAM (DRAM), a static RAM (SRAM) or a synchronous dynamic RAM (SDRAM), etc.) or a non-volatile memory (e.g.: a one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive or a solid state drive (SSD)). The memory detachable from the electronic apparatus 100 may include a memory card (e.g., compact flash (CF), secure digital (SD), micro secure digital (Micro-SD), mini secure digital (Mini-SD), extreme digital (xD), multi-media card (MMC), etc.), an external memory that can be connected to a USB port (e.g., a USB memory), etc.

According to an embodiment, the memory 130 may store the identification information of a plurality of display modules. For example, the memory 130 may receive the identification information of the remaining display modules connected in the daisy chain method from the first display module which corresponds to the master module and store the information.

In addition, the memory 130 may store the video data and control data received from an input device.

The user input interface 140 is configured to receive various user commands and information. The processor 120 may execute a function corresponding to the user command input through the user input interface 140, or store the information input through the user input interface 140 in the memory 130.

For example, the processor 120 may receive a brightness setting value regarding an image from a user through the user input interface 140 and store the value in the memory 130.

The user input interface 140 may include a microphone (not illustrated) for receiving a user command in the form of voice, or may be implemented as a display (a touch screen) for receiving a user command through a touch.

The display may be implemented in the form of a touch screen forming an inter-layered structure with a touch pad. Here, the touch screen is configured to detect not only the touch input location and size but also the touch input pressure.

In addition, the user input interface 140 may receive a signal including a user command or information regarding a task from a separate control device (not illustrated) for controlling the electronic apparatus 100.

The electronic apparatus 100 may further include a display (not illustrated).

FIG. 5 is a view provided to explain a daisy chain method of a modular display apparatus according to an embodiment.

For example, as illustrated in FIG. 5, each of the plurality of first communication interfaces 110-1 of the electronic apparatus 100 may be connected to a respective display module at the outer side of each of the groups 201 to 204 of the display modules which are combined in the daisy chain method in the form of 4×1. For example, each of the plurality of first communication interfaces 110-1 may be connected to each of the display modules (first display modules) 201-1, 202-1, 203-1, and 204-1 located at the bottom of each group 201, 202, 203, and 204, respectively.

Accordingly, the processor 120 may transmit control data to each display module (the first display modules, 201-1, 202-1, 203-1, 204-1) located at the bottom from among the plurality of display modules that belong to each group through each of a plurality of communication interfaces.

In this case, each display module located at the bottom may transmit the control data received from the electronic apparatus 100 to the display module located at the top.

Specifically, a plurality of display modules included in each group are connected with each other in the daisy chain method, and the display module located in the lower side may transmit control data to the display module located in the upper side.

As such, the control data may be transmitted to the display module located at the top (the second display module).

The transmission of control data above may be performed in each of a plurality of groups simultaneously.

In FIG. 5, the daisy chain method has been described with reference to control data, but the same method can be applied with respect to video data. In other words, the transmission of video data may be performed in each of a plurality of groups simultaneously and accordingly, the display apparatus 200 may reproduce an image corresponding to the video data received from the plurality of groups simultaneously.

FIG. 6 is a view provided to explain a daisy chain method of a modular display apparatus according to another embodiment.

For instance, as illustrated in FIG. 6, one group in which all of the plurality of display modules in the form of 3×4 are combined in the daisy chain method may be implemented as the display apparatus 200. In this case, the first communication interface 110-1 of the electronic apparatus 100 may be connected to the display module located at an outer side. For example, in some embodiments, the first communication interface 110-1 may be connected to a display module located at a lower left side (the first display module, 201-1 in FIG. 6).

In this case, the control data or video data transmitted from the electronic apparatus 100 may be transmitted to the second display module 201-4 located at the end of the daisy chain connection, starting from the first display module through the plurality of display modules. For example, the second display module 201-4 may be located at an upper right side, as shown in FIG. 6.

The daisy chain methods in FIGS. 5 and 6 are only examples, and they may be changed in various ways.

FIG. 7 is a view provided to explain a case in which a communication interface is changed if an error occurs in control data transmission according to an embodiment.

As illustrated in FIG. 7, a group of display modules connected in a 4×1 daisy chain method is assumed, and the first group 201 on the left side is described as an example.

For example, the first communication interface of the electronic apparatus 100 may be connected to the first display module 201-1 located at the bottom of the first group.

The processor 120 may transmit control data to the first display module 201-1 corresponding to the main module through the first communication interface 110-1.

In this case, the first display module 201-1 located at the bottom may transmit the control data received from the electronic apparatus 100 to the display module located at the upper side. However, it is assumed that an error has occurred in the connection connecting the display module 201-2 and the display module 201-3.

In this case, the display module 201-3 and the second display module 201-4 cannot receive the control data transmitted from the electronic apparatus 100. Accordingly, the display module 201-3 and the second display module 201-4 do not receive brightness information, etc. which is included in the control data and thus, a different brightness value may be output for each display module. A user who recognizes the entire image from the display apparatus 200 in which a plurality of display modules are combined may feel discomfort or heterogeneity because brightness is recognized differently for each display module.

In order to resolve the above problem, according to an embodiment, the processor 120 may transmit again the control data through the second communication interface 110-2 connected to the second display module 201-4 located at the top of the first group 201.

In this case, the second display module 201-4 located at the top may transmit the control data received from the electronic apparatus 100 to the display module 201-3 located at the lower side of the second display module 201-4.

As such, the control data transmitted through the first communication interface 110-1 and the second communication interface 110-2 may be transmitted to all of the plurality of display modules included in the first group 201.

Figure 8:
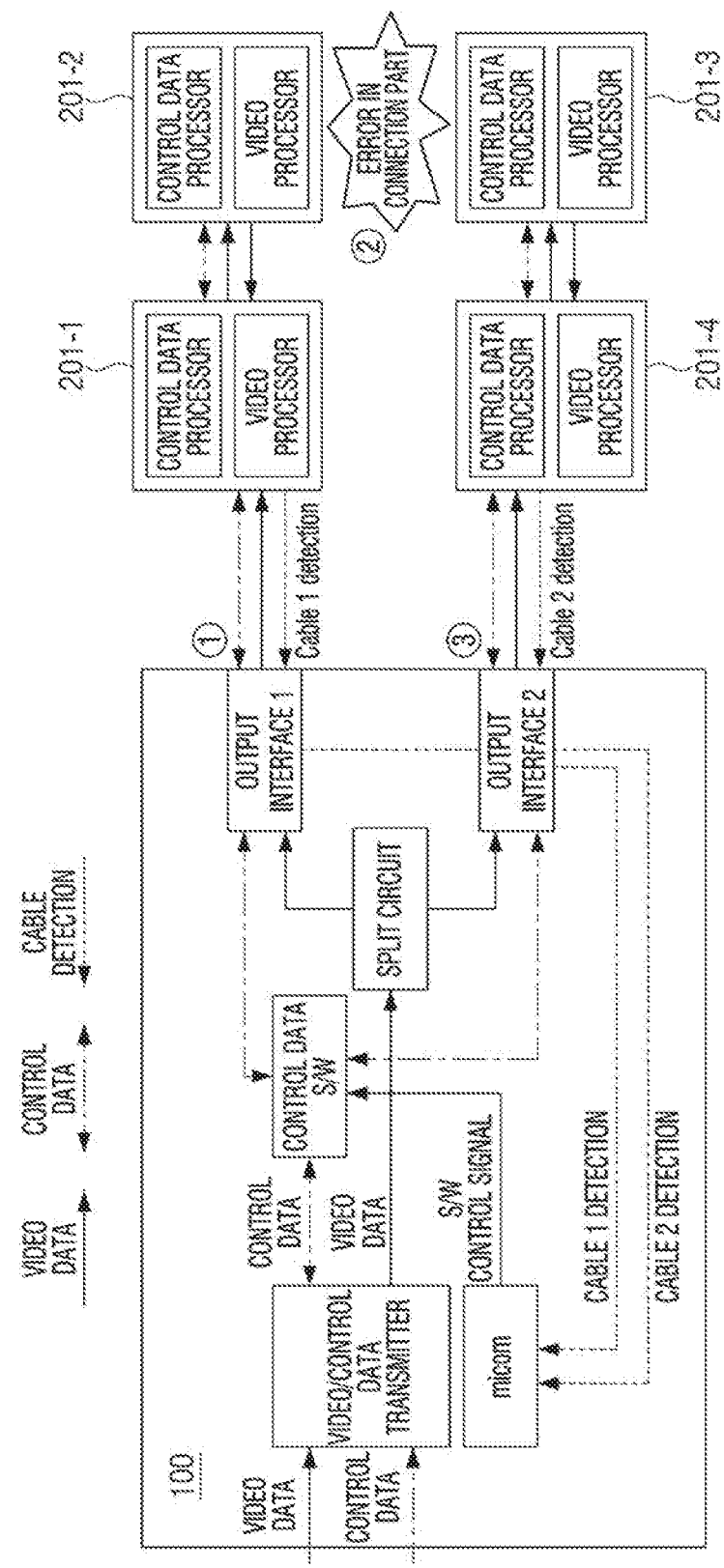
FIG. 8 is a detailed block diagram of an electronic apparatus and a display apparatus and a view provided to explain an error of a connection part according to an embodiment.

FIG. 8 is a detailed block diagram of an electronic apparatus and a display apparatus and a view provided to explain an error of a connection according to an embodiment.

Referring to FIG. 8, the electronic apparatus 100 includes a video/control data transmitter, a micro controller (micom), control data switch (S/W), a split circuit, an output interface 1, and an output interface 2.

The video/control data transmitter is configured to store the video data and control data received from an input device, and transmit the stored control data to the control data S/W or transmit the stored video data to the split circuit under the control of the micom.

The micom is configured to determine an output interface to which control data and video data is transmitted. The processor 120 described above may be implemented as and correspond to the micom.

The output interface 1 may correspond to the first communication interface 110-1 that transmits data to the first display module 201-1, and the output interface 2 may correspond to the second communication interface 110-2 that transmits data to the second display module 201-4. It is noted that only one group 201 of display modules 201-1, 201-2, 201-3, and 204-1 is shown in FIG. 8 for conciseness of description.

The split circuit may copy the video data transmitted from the video/control data output transmitter and transmit a portion of the video data to the output interface 1, and transmit the remaining video data to the output interface 2.

The control data S/W may identify an output interface to which the control data transmitted from the video/control data transmitter is transmitted based on a cable detection state.

Meanwhile, the control data processor of a display module may determine whether to obtain control data from the other display modules in the group based on the identification information included in the control data. For example, if the IP address of the first display module 201-1 is included in the destination field of the control data received from the electronic apparatus 100, the first display module 201-1 may perform an operation corresponding to the control data by obtaining the corresponding control data. Alternatively, if an IP address of the first display module 201-1 is not included in the destination field of the control data, the first display module 201-1 may not perform an operation corresponding to the control data and transmit the control data to the second display module 201-2 connected thereto. That is because the control data is transmitted through a unicast method or a multicast method.

In addition, the video processor of a display module may first obtain video data. Specifically, the video processor may obtain and store the transmitted video data and transmit the video data to another display module. Subsequently, the video processor may identify a corresponding image signal from among the video data obtained based on the arrangement information of display modules and reproduce the corresponding image. For example, in the case of the first display module 201-1 disposed at the bottom of a group (see, e.g., FIG. 5), the video processor of the first display module 201-1 may obtain the video data transmitted from the electronic apparatus 100, identify a partial image corresponding to the bottom display module (i.e. the first display module 201-1), and reproduce the corresponding image. Accordingly, each display module may display the entire image by reproducing a partial image according to its own arrangement state.

Meanwhile, the connection state of the cable 1 connected to the output interface 1 and the connection state of cable 2 connected to the output interface 2 may be detected based on the voltage value measured at the output interface 1 and the output interface 2. The micom may identify the output interface to which the control data is transmitted based on the detection information of the cable 1 and the cable 2. For example, if the connection state of the cable 1 and the cable 2 is normal, the micom may transmit the control data to the first display module 201-1 corresponding to the main display module 201-1 through the output interface 1 by transmitting a S/W control signal to the control data S/W so as to transmit the control data through the output interface 1 (①).

Subsequently, the micom may identify a display module in which an error has occurred according to the reception of data received in response to a communication checkup signal. For example, the micom may identify that the display module 201-3 and the second display module 201-4 do not receive the control data because an error has occurred in the connection between the display module 201-2 and the display module 201-3 (②).

If the error has occurred, the micom may transmit the control data to the second display module 201-4 through the output interface 2 by transmitting the S/W control signal to the control data S/W (③).

Figure 9:
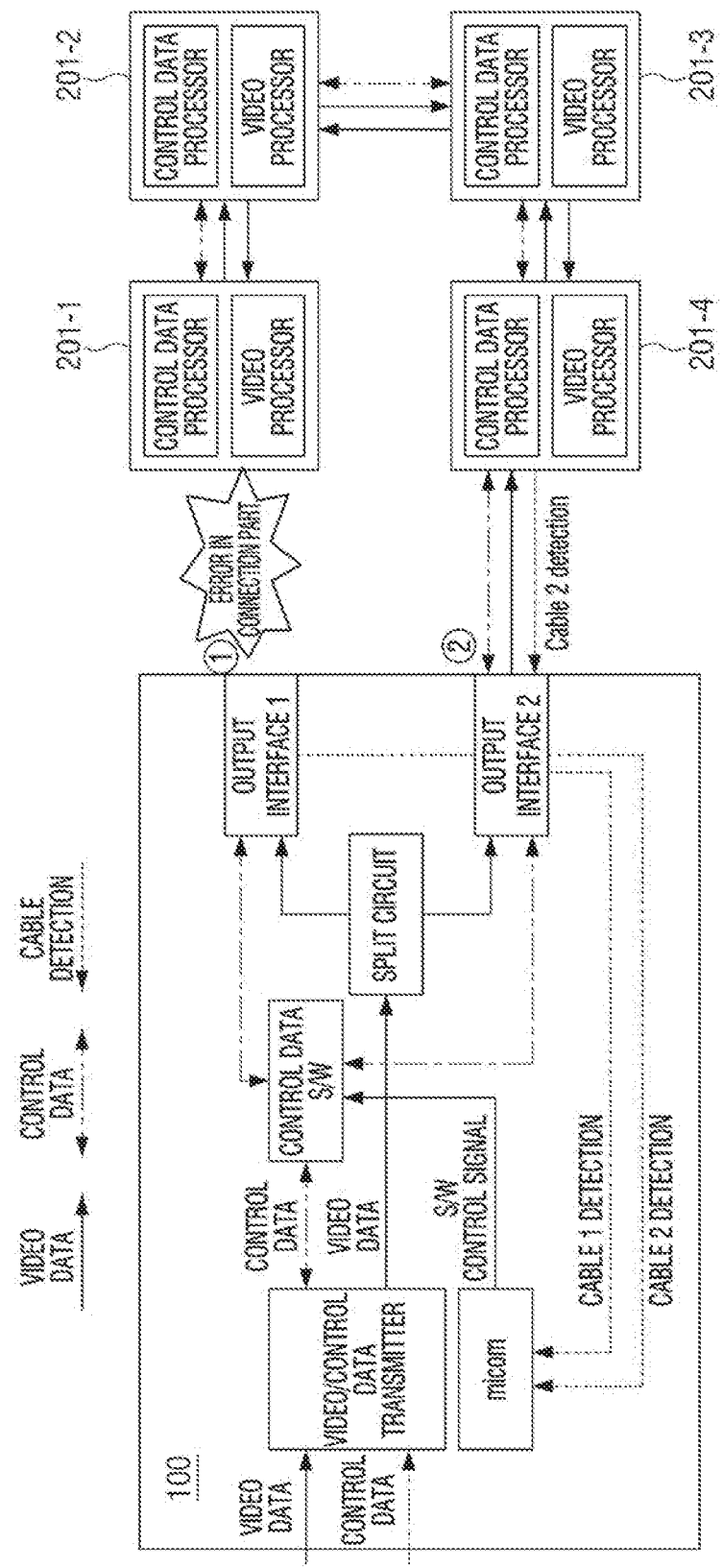
FIG. 9 is a view provided to explain an error of a connection part according to an embodiment.

FIG. 9 is a view provided to explain an error of a connection according to an embodiment.

The configuration of the components of the electronic apparatus 100 and the display apparatus 200 in FIG. 9 are the same as the configuration in FIG. 8 and thus, detailed description thereof will be omitted.

The connection state of the cable 1 connected to the output interface 1 and the cable 2 connected to the output interface 2 may be detected based on the voltage value measured in the output interface 1 and the output interface 2. The micom may identify the output interface to which the control data is transmitted based on the detection information of the cable 1 and the cable 2. For example, if an error is identified in the connection state of the cable 1 (①), the micom may transmit the control data to the second display module 201-4 corresponding to the sub display module through the output interface 2 by transmitting a S/W control signal to the control data S/W so that the control data is transmitted through the output interface 2 (②).

The control data transmitted to the second display module 201-4 through the output interface 2 may be transmitted to the first display module 201-1 through the display module 201-3 and the display module 201-2.

Figure 10:
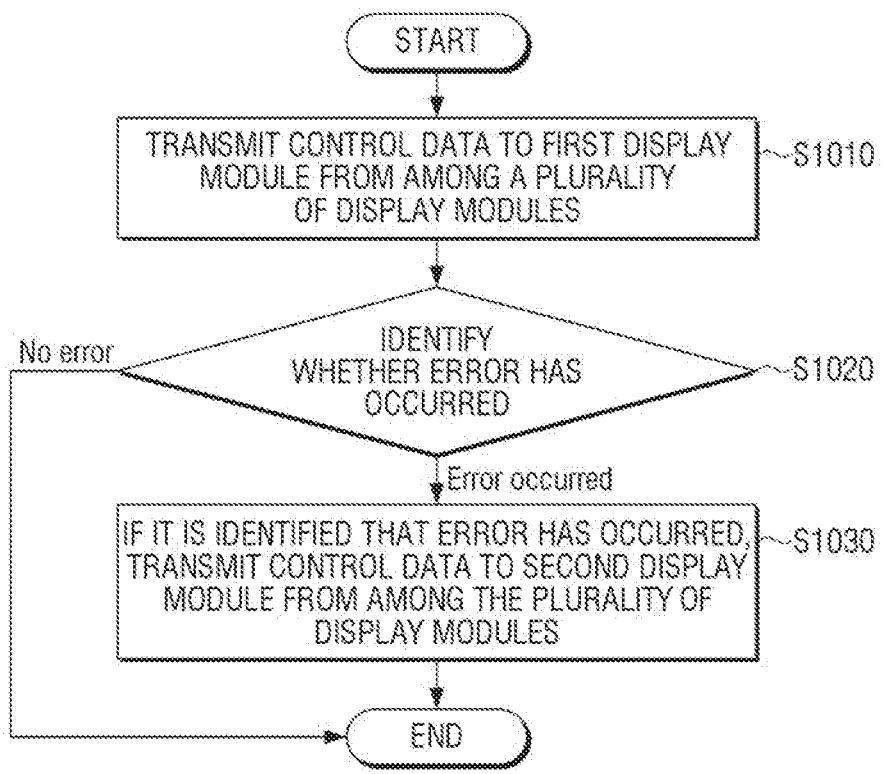
FIG. 10 is a flowchart provided to explain a controlling method of an electronic apparatus which communicates with a display apparatus including a plurality of display modules according to an embodiment.

FIG. 10 is a flowchart provided to explain a controlling method of an electronic apparatus which communicates with a display apparatus including a plurality of display modules, according to an embodiment.

The electronic apparatus 100 may transmit control data to a first display module from among a plurality of display modules (S1010).

Here, the plurality of display modules may be connected in the daisy chain method. The daisy chain method denotes a communication connection method in which the control data transmitted to the first display module is sequentially transmitted to the second display module through at least one third display module disposed between the first display module and the second display module, as described above.

In addition, the control data denotes data regarding a control command signal for controlling the state of each of the plurality of display modules, and may include at least one of contrast information, brightness information, arrangement state information or power on/off information of each of the plurality of display modules.

The electronic apparatus 100 may identify whether an error has occurred (S1020).

Specifically, according to an embodiment, the electronic apparatus 100 may identify whether an error has occurred in reception of the control data in at least one of the plurality of display modules. The electronic apparatus 100 may transmit a communication checkup signal including the identification information of each of the plurality of display modules to the first display module at timing intervals, and if identification information included in a response signal to the communication checkup signal is not received from at least one of the plurality of display modules, the electronic apparatus 100 may identify that an error has occurred in the reception of the control data in at least one of the plurality of display modules.

Here, the identification information of each of the plurality of display modules may include IP address information, and the communication checkup signal may be a Ping signal.

If it is identified that an error has occurred in the reception of the control data, the electronic apparatus 100 may transmit the control data to the second display module from among the plurality of display modules (S1030). The second display module may be another display module of the plurality of display modules in the daisy chain that is positioned at an opposite end of the daisy chain from the first display module.

Specifically, the electronic apparatus 100 may identify at least one display module that has not receive the control data based on the identification information of at least one display module included in a response signal to the communication checkup signal, and include the identification information of the at least one display module that has not received the control data in the control data and transmit the control data to the second display module.

Here, the first display module may be a master module, and the second display module may be a slave module.

Specifically, according to another embodiment, the electronic apparatus 100 may identify whether an error has occurred in the communication connection between the first communication interface and the first display module. If it is identified that an error has occurred in the communication connection between the first communication interface and the first display module, the electronic apparatus 100 may transmit the control data to the second display module.

The electronic apparatus 100 may transmit video data to the first display module, and transmit the video data to the second display module.

Each of the above-described plurality of display modules may be implemented as a light emitting diode (LED) cabinet including a plurality of LED elements.

The detailed operations of each step have been described above, so further description will be omitted.

Meanwhile, the methods according to the above-described various embodiments may be implemented in the form of an application installable in the electronic apparatus. For example, the methods may be implemented by installing an application coded with the method that is installed in a related art electronic apparatus.

In addition, the methods according to the above-described various embodiments may be implemented through a software upgrade or a hardware upgrade of a related art electronic apparatus Further, the above-described various embodiments may be performed through an embedded server included in the electronic apparatus, or at least one external server of the electronic apparatus and the display device.

According to an embodiment, the above-described various embodiments may be implemented as software including computer code containing one or more instructions and stored in a storage medium which can be read by machine (e.g., a computer). For instance, the processor may load at least one instruction from among the stored one or more instructions from the storage medium and execute the at least one instruction to perform an operation according to the at least one instruction, and may include an electronic apparatus according to embodiments. When the instruction is executed under the control of the processor, the processor directly or using other components under the control of the processor may perform a function corresponding to the instruction. The one or more instructions may include a code generated by a complier or a code that may be executed by an interpreter. The storage medium which can be read by machine may be provided in the form of a non-transitory storage medium. Here, 'non-transitory' merely means that the storage medium is a tangible device and does not include a signal, and this term is not used to distinguish a case where data is stored in the storage medium semi-permanently from a case where data is stored temporarily.

According to an embodiment, a method according to the various embodiments may be included in a computer program product and provided therein. The computer program product may be traded between a seller and a buyer as a product. The computer program product may be distributed in the form of a storage medium that can be read by machine (e.g., compact disc read only memory (CD-ROM), or may be distributed online (e.g., downloaded or uploaded) through an application store (e.g., PlayStore™) or directly between two user devices. In the case of online distribution, at least a portion of the computer program product may be at least temporarily stored in a storage medium such as a memory of a server of a manufacturer, a server of an application store, or a relay server, or may be temporarily generated.

In addition, according to one embodiment, various embodiments described above may be read by a computer or a similar device using software, hardware, or a combination thereof. It can be implemented in a recording medium. In some cases, the embodiments described herein may be implemented by the processor itself. According to the software implementation, embodiments such as the procedures and functions described herein may be implemented as separate software modules. Each of the software modules may perform one or more functions and operations described herein.

The computer instructions to perform processing operations of a device according to the above-described various embodiments may be stored in a non-transitory computer-readable medium. The computer instructions stored in the non-transitory computer readable medium allow the specific device to perform processing operations in the device according to the above-described various embodiments when executed by the processor of the specific device.

Here, a non-transitory computer readable medium denotes to a medium that stores data semi-permanently rather than a medium storing data for a short time such as a register, a cache, a memory, and the like, and can be read by a device. Specific examples of non-transitory computer readable media may include CD, DVD, hard disk, Blu-ray disk, USB, memory card, ROM, and the like.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

Although various embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure and the appended claims.

What is claimed is:

1. An electronic apparatus that communicates with an external display apparatus including a plurality of display modules, the electronic apparatus comprising:
 a first communication interface connected to a first display module from among the plurality of display modules connected together in a daisy chain configuration;
 a second communication interface connected to a second display module from among the plurality of display modules; and
 a processor configured to:
 transmit control data to the first display module through the first communication interface,
 control the first communication interface to transmit a communication checkup signal including identification information of each of the plurality of display modules to the first display module, and
 in response to receiving a response signal from at least one of the plurality of display modules as a response to the communication checkup signal, identify whether an error has occurred based on the identification information included in the response signal, or in response to not receiving the response signal, identify that the error has occurred,
 in response to identifying that the error has occurred, control the second communication interface to transmit the control data to the second display module.

2. The electronic apparatus as claimed in claim 1, wherein the processor is configured to:
 control the first communication interface to transmit the communication checkup signal to the first display module at a timing interval.

3. The electronic apparatus as claimed in claim 2, wherein the identification information of each of the plurality of display modules includes an internet protocol (IP) address, and
 wherein the communication checkup signal is a Packet internet Groper (Ping) signal.

4. The electronic apparatus as claimed in claim 2, wherein the processor is configured to:
 identify at least one display module which does not receive the control data based on identification information of the at least one display module included in the response signal received in response to the communication checkup signal, and
 include the identification information of the at least one display module which does not receive the control data in control data and transmit the control data to the second display module.

5. The electronic apparatus as claimed in claim 1, wherein the processor is configured to, based on identifying that there is an error in a communication connection between the first communication interface and the first display module, control the second communication interface to transmit the control data to the second display module.

6. The electronic apparatus as claimed in claim 1, wherein the first display module is a master module, and
 wherein the second display module is a slave module.

7. The electronic apparatus as claimed in claim 6, wherein the daisy chain configuration is a communication connection configuration in which the control data transmitted to the first display module arrives at the second display module by sequential transmission through at least one third display module disposed between the first display module and the second display module.

8. The electronic apparatus as claimed in claim 1, wherein each of the control data and the control data includes at least one of contrast information, brightness information, arrangement state information and/or power on/off information of each of the plurality of display modules.

9. The electronic apparatus as claimed in claim 1, further comprising:
 a third communication interface connected to the first display module; and
 a fourth communication interface connected to the second display module,
 wherein the processor is configured to transmit video data to the first display module through the third communication interface, and transmit the video data to the second display module through the fourth communication interface.

10. The electronic apparatus as claimed in claim 1, wherein each of the plurality of display modules includes a Light Emitting Diode (LED) cabinet comprising a plurality of LED elements.

11. A method of an electronic apparatus that communicates with an external display apparatus including a plurality of display modules, the method comprising:
 transmitting control data to a first display module from among the plurality of display modules connected together in a daisy chain configuration;
 transmitting a communication checkup signal including identification information of each of the plurality of display modules to the first display module;
 in response to receiving a response signal from at least one of the plurality of display modules as a response to the communication checkup signal, identifying whether an error has occurred based on the identification information included in the response signal, or in response to not receiving the response signal, identifying that the error has occurred; and
 based on identifying that the error has occurred, transmitting the control data to a second display module from among the plurality of display modules.

12. The method as claimed in claim 11, wherein the transmitting comprises:
 transmitting a communication checkup signal to the first display module at a timing interval.

13. The method as claimed in claim 12, wherein the identification information of each of the plurality of display modules includes an internet protocol (IP) address, and
 wherein the communication checkup signal is a Packet internet Groper (Ping) signal.

14. The method as claimed in claim 12, wherein the transmitting the control data comprises identifying at least one display module which does not receive the control data based on identification information of the at least one display module included in the response signal received in response to the communication checkup signal, and
 including the identification information of the at least one display module which does not receive the control data in the control data and transmitting the control data to the second display module.

15. The method as claimed in claim 11, further comprising:
based on identifying that there is an error in a communication connection between the first communication interface and the first display module, transmitting the control data to the second display module.

16. The method as claimed in claim 11, wherein the first display module is a master module, and
wherein the second display module is a slave module.

17. The method as claimed in claim 16, wherein the daisy chain configuration is a communication connection configuration in which the control data transmitted to the first display module arrives at the second display module by sequential transmission through at least one third display module disposed between the first display module and the second display module.

18. The method as claimed in claim 11, wherein each of the control data and the control data includes at least one of contrast information, brightness information, arrangement state information and/or power on/off information of each of the plurality of display modules.

19. The method as claimed in claim 11, further comprising:
transmitting video data to the first display module, and transmitting the video data to the second display module.

20. The method as claimed in claim 11, wherein the each of the plurality of display modules includes a Light Emitting Diode (LED) cabinet comprising a plurality of LED elements.

* * * * *